US011383820B2

(12) United States Patent
Burton et al.

(10) Patent No.: US 11,383,820 B2
(45) Date of Patent: Jul. 12, 2022

(54) AERODYNAMIC SURFACE LAP SPLICE

(71) Applicant: The Boeing Company, Chicago, IL (US)

(72) Inventors: Jeffrey Michael Burton, Seattle, WA (US); Stephen Roger Amorosi, Seattle, WA (US)

(73) Assignee: The Boeing Company, Chicago, IL (US)

( * ) Notice: Subject to any disclaimer, the term of this patent is extended or adjusted under 35 U.S.C. 154(b) by 417 days.

(21) Appl. No.: 16/438,369

(22) Filed: Jun. 11, 2019

(65) Prior Publication Data

US 2020/0391842 A1    Dec. 17, 2020

(51) Int. Cl.
| | | |
|---|---|---|
| *B64C 3/28* | (2006.01) | |
| *B64C 3/26* | (2006.01) | |
| *B29C 70/38* | (2006.01) | |
| *B29C 70/54* | (2006.01) | |
| *B29L 31/30* | (2006.01) | |

(52) U.S. Cl.
CPC .............. *B64C 3/28* (2013.01); *B64C 3/26* (2013.01); *B29C 70/38* (2013.01); *B29C 70/545* (2013.01); *B29L 2031/3085* (2013.01)

(58) Field of Classification Search
CPC .................................. B64C 3/26; B64C 3/28
See application file for complete search history.

(56) References Cited

U.S. PATENT DOCUMENTS

| | | | | |
|---|---|---|---|---|
| 4,888,451 A * | 12/1989 | Toni | ........................ | B64D 45/02 |
| | | | | 174/94 R |
| 9,371,125 B2 * | 6/2016 | Gallant | ...................... | B64C 1/12 |
| 2005/0211846 A1 * | 9/2005 | Leon-Dufour | .......... | B64C 3/182 |
| | | | | 244/126 |
| 2006/0251496 A1 * | 11/2006 | Wood | ........................ | F16B 5/02 |
| | | | | 411/507 |
| 2008/0164376 A1 * | 7/2008 | Kato | .......................... | B64C 3/28 |
| | | | | 244/132 |
| 2008/0258008 A1 * | 10/2008 | Cooper | ...................... | B64C 1/12 |
| | | | | 244/131 |
| 2009/0208284 A1 * | 8/2009 | Funnell | .................. | F16B 5/0642 |
| | | | | 403/374.3 |
| 2010/0065688 A1 * | 3/2010 | Wood | ..................... | B29C 65/483 |
| | | | | 244/131 |
| 2010/0068450 A1 * | 3/2010 | Lloyd | ........................ | B32B 3/02 |
| | | | | 428/99 |
| 2010/0247903 A1 * | 9/2010 | Martinez Valdegrama | ................. | |
| | | | | B32B 5/26 |
| | | | | 428/332 |
| 2010/0308170 A1 * | 12/2010 | Hadley | ...................... | B64C 1/12 |
| | | | | 244/131 |
| 2011/0233338 A1 * | 9/2011 | Stewart | ...................... | B64C 3/28 |
| | | | | 244/131 |
| 2012/0132753 A1 | 5/2012 | Caballero et al. | | |

(Continued)

FOREIGN PATENT DOCUMENTS

WO    WO 2009/118548    10/2009

*Primary Examiner* — Michael H Wang
(74) *Attorney, Agent, or Firm* — Haynes and Boone, LLP

(57) ABSTRACT

Systems and methods for an aerodynamic device with a lap splice that includes an edge panel is described herein. In edge panel can include a tapered section. A portion of a skin of the aerodynamic device can be disposed below the tapered section. One or both of the edge panel or the skin can be composite. The tapered section of the edge panel can be formed by decreasing the ply thickness of the edge panel.

20 Claims, 11 Drawing Sheets

(56) References Cited

U.S. PATENT DOCUMENTS

| | | | |
|---|---|---|---|
| 2012/0132754 A1* | 5/2012 | Pina Lopez | B64C 1/06 244/131 |
| 2013/0270392 A1 | 10/2013 | Derqui et al. | |
| 2016/0244143 A1* | 8/2016 | Foster | B64F 5/10 |
| 2017/0327203 A1* | 11/2017 | Holmes | B64C 3/26 |
| 2019/0009884 A1* | 1/2019 | Zeon | B64C 5/02 |
| 2019/0055001 A1* | 2/2019 | Kamo | G06F 30/00 |

* cited by examiner

AERODYNAMIC SURFACE LAP SPLICE

TECHNICAL FIELD

The disclosure relates generally to aircraft aerodynamic surfaces and more particularly to structures of such aerodynamic surfaces.

BACKGROUND

The exterior surfaces of aircraft and other vehicles are often formed by a plurality of panels. Such panels typically need to be mechanically coupled to each other and/or to underlying aircraft structures. Gaps may form due to such coupling. Such gaps can lead to increased aerodynamic disturbance, increasing drag and decreasing generated lift. Reducing or eliminating such gaps can thus improve aircraft performance.

To decrease or eliminate such gaps, existing techniques utilize splice straps and/or fillers. However, splice straps are additional parts and generally require extra fasteners, shimming, sealing, or erosion shields. Fillers need to be applied as an additional step and typically require shimming or bonding.

SUMMARY

Systems and methods are disclosed for an aircraft structure. In a certain example, the aircraft structure can include an edge panel and a skin. The edge panel can include a first edge panel portion and a tapered second edge panel portion, where the first edge panel portion is a constant first thickness, where the tapered second edge panel portion includes a first end proximal to the first edge panel portion and a second end distal to the first edge panel portion, and where the tapered second edge panel portion decreases in thickness from a first end to a second end. The skin can include a first portion, a second portion, and a first bend disposed between the first portion and the second portion. The first portion and the second portion can be of a substantially constant second thickness, where at least a part of the second portion is disposed below at least a part of the tapered second edge panel portion, and where the second thickness is greater than the first thickness.

In another example, an edge panel can be disclosed. The edge panel can include a first edge panel portion of a constant thickness and a multi-ply composite tapered second edge panel portion. The multi-ply composite tapered second end panel portion can include a first end proximal to the first edge panel portion and a second end distal to the first edge panel portion, where the tapered second edge panel portion decreases in thickness from a first end to a second end, where the tapered second edge panel portion decreases in thickness by decreasing an amount of plies, and where a ply drop offset proximate to the first end is greater than a ply drop offset proximate to the second end.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various examples of aerodynamic surface lap splices are described herein. Such aerodynamic surface lap splices can be utilized in aerodynamic structures. As described herein, such aerodynamic structures can include, for example, wings, empennages, tails, engine inlets or outlets, fuselages, or other surfaces of an aircraft. The aircraft structure can include an edge panel and a skin portion. The edge panel can include a first edge panel portion and a tapered second edge panel portion decreasing in thickness from a first end to a second end. The skin portion can include a first portion, a second portion, and a first bend disposed between the first portion and the second portion.

The aerodynamic lap splices described herein allows for two adjacent surface aerodynamic components to maintain a smooth aerodynamic contour between their interfaces. Furthermore, such aerodynamic surface lap splices allows for simplified installation of components, reducing or eliminating any need for fillers and reducing parts count and weight, while maintaining structure strength.

Figure 1:
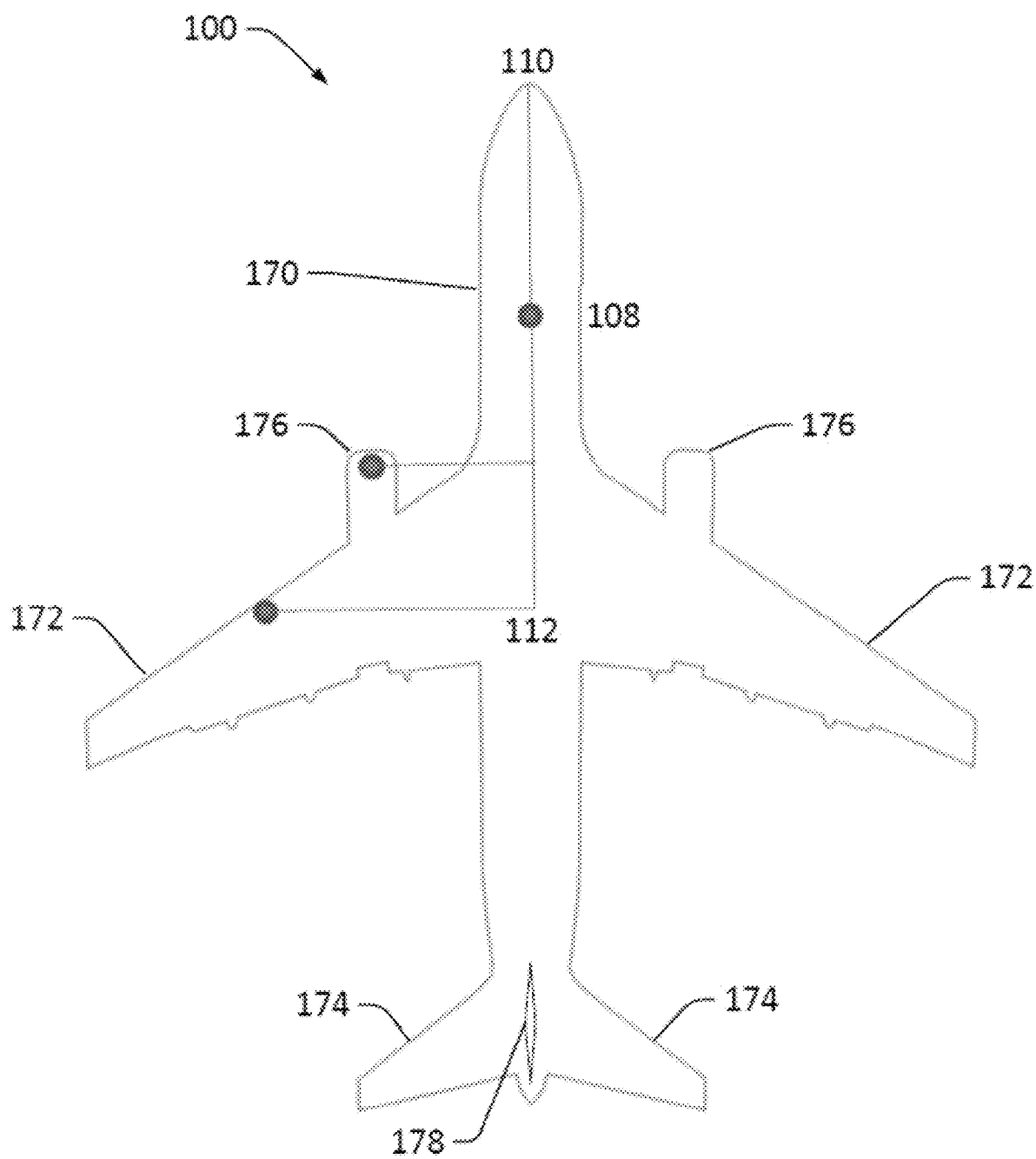
FIG. 1 illustrates an aircraft in accordance with an example of the disclosure.

FIG. 1 illustrates an aircraft in accordance with an example of the disclosure. The aircraft 100 of FIG. 1 can include fuselage 170, wings 172, horizontal stabilizers 174, aircraft engines 176, and vertical stabilizer 178. Additionally, aircraft 100 can include communications electronics 110, controller 108, and communications channel 112.

Aircraft 100 described in FIG. 1 is exemplary and it is appreciated that in other examples, aircraft 100 can include more or less components or include alternate configurations. Additionally, concepts described herein can be extended to other aircraft such as helicopters, drones, missiles, etc.

Communications electronics 110 can be electronics for communication between aircraft 100 and other mobile or immobile structures (e.g., other aircrafts, vehicles, buildings, satellites, or other such structures). Communications electronics 110 can be disposed within fuselage 170, wings 172, horizontal stabilizers 174, vertical stabilizer 178, and/or another portion of aircraft 100. Communications electronics 110 can include an antenna for sending and receiving signals. Examples of various antenna configurations are described herein.

Communications channel 112 can allow for communications between controller 108 and various other systems of aircraft 100. Accordingly, communications channel 112 can link various components of aircraft 100 to the controller 108. Communications channel 112 can, for example, be either a wired or a wireless communications system.

Controller 108 can include, for example, a microprocessor, a microcontroller, a signal processing device, a memory storage device, and/or any additional devices to perform any of the various operations described herein. In various examples, controller 108 and/or its associated operations can be implemented as a single device or multiple connected devices (e.g., communicatively linked through wired or wireless connections such as communications channel 112) to collectively constitute controller 108.

Controller 108 can include one or more memory components or devices to store data and information. The memory can include volatile and non-volatile memory. Examples of such memory include RAM (Random Access Memory), ROM (Read-Only Memory), EEPROM (Electrically-Erasable Read-Only Memory), flash memory, or other types of memory. In certain examples, controller 108 can be adapted to execute instructions stored within the memory to perform various methods and processes described herein, including implementation and execution of control algorithms responsive to sensor and/or operator (e.g., flight crew) inputs.

Wings 172, horizontal stabilizers 174, and vertical stabilizers 178, as well as inlets of aircraft engines 176 and portions of the fuselage 170 can be referred to herein as aerodynamic surfaces. Aerodynamic surfaces can be surfaces that generate lift, downforce, and/or otherwise affect the stability or flight of the aircraft 100. In certain examples, aerodynamic surfaces utilizing the aerodynamic surface lap splices can be disposed at or near the leading or trailing edges of the wings 172, horizontal stabilizers 174, vertical stabilizers 178, aircraft engines 176, and/or fuselage 170.

Figure 2:
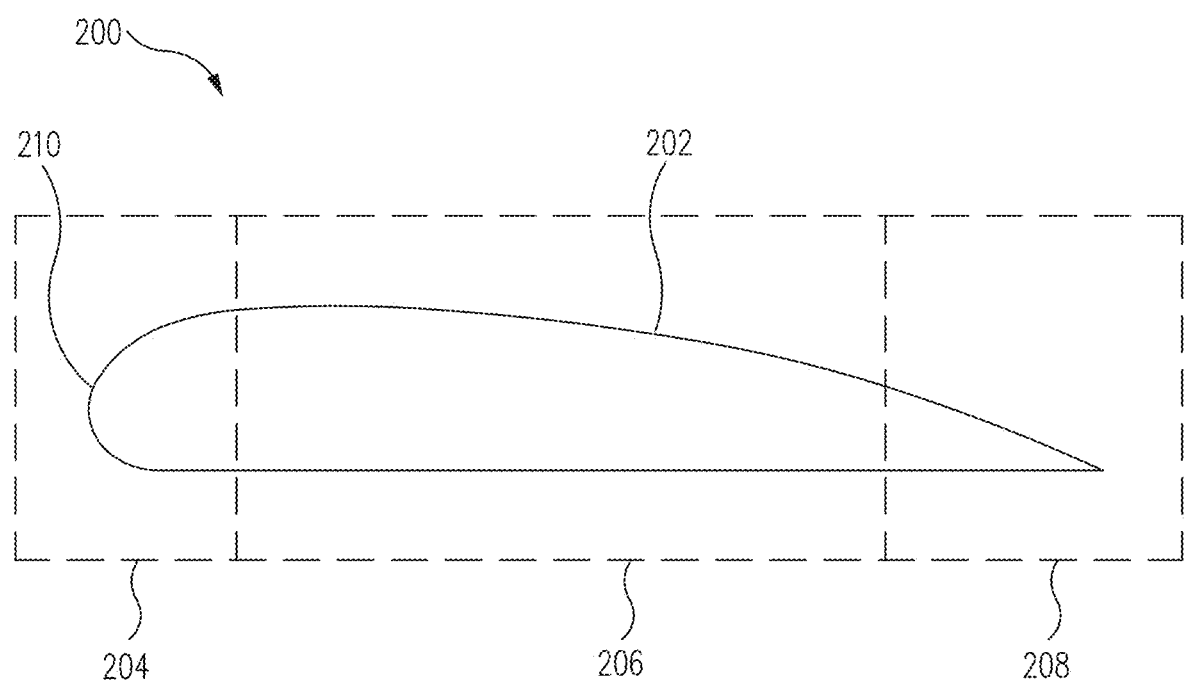
FIG. 2 illustrates an aircraft wing in accordance with an example of the disclosure.

FIG. 2 illustrates an aircraft wing in accordance with an example of the disclosure. FIG. 2 shows an aircraft wing 200 that includes a wing body 202 and a leading edge 210. The wing 200 can be divided into portions 204, 206, and 208. Portion 204 can be a leading portion. Portion 206 can be a middle portion. Portion 208 can be a trailing portion. The leading edge 210 of the aircraft wing 200 can be disposed within the portion 204. In certain examples, the aerodynamic surface lap splices described herein are disposed within the portion 204 (e.g., within the leading edge 210), but other examples can dispose the aerodynamic surface lap splices within portions 206 or 208.

FIGS. 3-6 illustrate side cutaway views of portions of aerodynamic structures utilizing aerodynamic surface lap splices in accordance with examples of the disclosures. For the purposes of this disclosure, "aerodynamic structure" refers to any structure or component that interacts with airflow around the aircraft 100. That is, during operation of the aircraft 100, air can flow along at least a portion of such an aerodynamic structure. Examples of such aerodynamic structures can include wings, empennages, engine inlets and outlets, fuselages, tails, and other portions of the aircraft 100. The aerodynamic structure can be defined by one or more aerodynamic surfaces (e.g., surfaces subjected to airflow).

Figure 3:
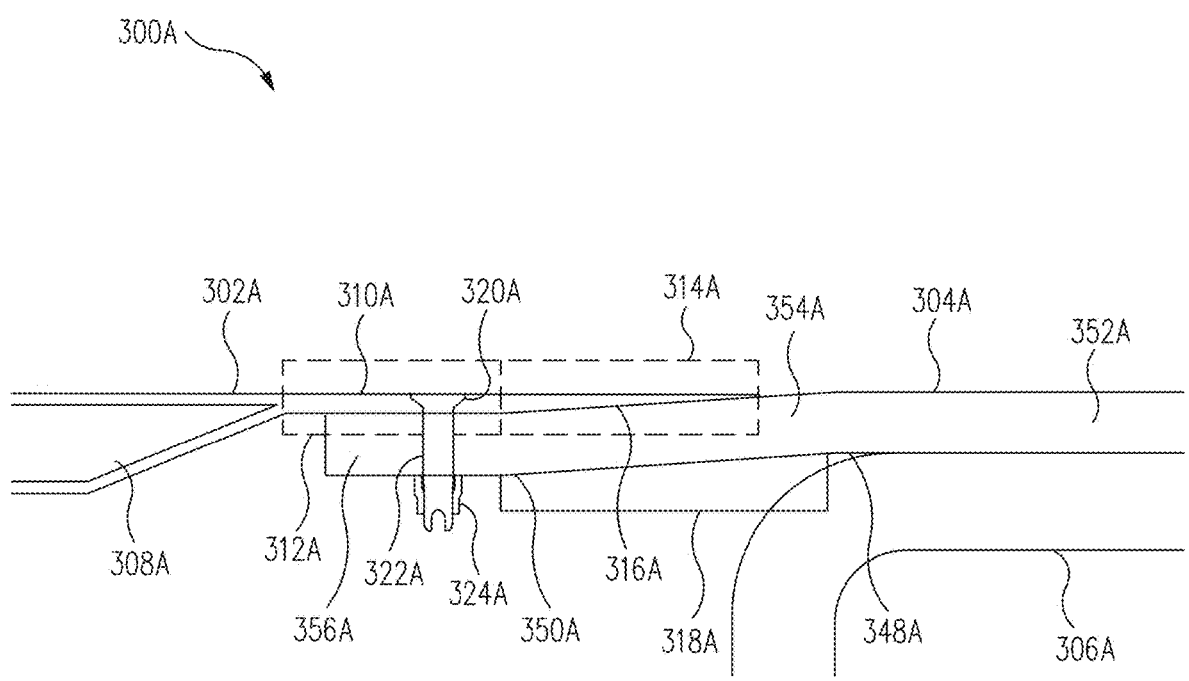
FIGS. 3-6 illustrate side cutaway views of portions of aerodynamic structures utilizing aerodynamic surface lap splices in accordance with examples of the disclosures.

FIG. 3 illustrates aerodynamic structure 300A that includes a lap splice that includes an edge panel 302A and a skin 304A. In certain examples, skin 304A is coupled to structural member 306A. Structural member 306A can provide structure support for the skin 304A and, hence, the edge panel 302A.

At least a portion of the edge panel 302A can be an aerodynamic surface of the aircraft 100. The edge panel 302A can include a first edge panel portion 308A and a second edge panel portion 310A. The first edge panel portion 308A can, in certain examples, be the same thickness or thicker than the second edge panel portion 310A. The leading edge of the aerodynamic structure 300A can be a part of the first edge panel portion 308A. In certain examples, the first edge panel portion 308A can include a honeycomb disposed between composite layers such as carbon fiber, fiberglass, Kevlar®, or other composites to increase the strength of the edge panel 302A. As such, the first edge panel portion 308A can be thicker than the second edge panel portion 310A.

At least a portion of the second edge panel portion 310A can overhang the skin 304A. Thus, the second edge panel portion 310A can form at least a portion of a lap splice that couples together the edge panel 302A and the skin 304A. Furthermore, the second edge panel portion 310A can include a constant thickness portion 312A and a tapered portion 314A. The constant thickness portion 312A can include a first end of the second edge panel portion 310A. The first end can be disposed proximal (e.g., adjacent or next to) to the first edge panel portion 308A. The tapered portion 314A can include a second edge of the second edge panel portion 310A. The second end can be disposed distal (e.g., away from) the first edge panel portion 308A. In certain examples, the second end can be, for example, the rightmost point of the edge panel 302A as shown in FIG. 3.

The constant thickness portion 312A can be of a single constant thickness through the entire portion. Thus, where the first end is at a first edge of the constant thickness portion 312A, the constant thickness portion 312A can be a single constant thickness from the first end to the other edge of the constant thickness portion 312A. In certain examples, the thickness of the skin 304A can be greater than that of the thickness of the constant thickness portion 312A. For example, the skin 304A can be thicker by three times or greater than that of the constant thickness portion 312A.

The tapered portion 314A can disposed proximate to the constant thickness portion 312A. The tapered portion 312A can decrease in thickness from the end proximate to the constant thickness portion 312A to the second end opposite that of the constant thickness portion 312A. The tapered portion 312A can be configured to disposed proximate to a jog of the skin 304A to form the lap splice or a portion thereof. Accordingly, the tapered portion 312A can include a ramp surface 316A disposed proximate to the skin 304A.

The skin 304A can be disposed rearward of the edge panel 302A. That is, during operation of the aircraft 100, airflow can first pass over the edge panel 302A before flowing over the skin 304A. At least a portion of the skin 304A can be an aerodynamic surface of the aerodynamic structure 300A.

The skin 304A can include a first portion 352A, a second portion 354A, and a third portion 356A. The second portion 354A can be disposed at an angle to the first portion 352A due to a bend 348A. The third portion 356A can be disposed at an angle to the second portion 354A due to a bend 350A. As such, the first portion 352A, the second portion 354A, and the third portion 354C can form a joggle.

The edge panel 302A can be coupled to the skin 304A via one or more fasteners, such as fastener 322A. The edge panel 302A can be held relative to the skin 304A through bolt 324A. Fastener 322A can have a flush head 320A. The edge panel 302A and the skin 304A can include appropriate through holes to accommodate such fasteners. As such, when the edge panel 302A is coupled to the skin 304A, the flush head 320A does not substantially protrude (e.g., within +/−2 inches) from the surface of the edge panel 302A and so does not substantially disturb airflow over the surface of the edge panel 302A.

In certain examples, the profile of the outer surface of the second portion 354A and/or the third portion 356A can substantially match that of the profile of the inner surface of the tapered portion 312A. Thus, the tapered portion 312A can be snugly positioned proximate to the skin 304A. The outer surface of the first portion 352A can be positioned to be substantially (e.g., within +/−2 inches) planar with the outer surface of the edge panel 302A when end panel 302A is coupled to the skin 304A. As such, the outer surface of the aerodynamic structure 300A can be relatively smooth when assembled, improving airflow over the surface of the aerodynamic structure 300A.

In certain examples, the skin 304A or the portion of the skin 304A coupled to the edge panel 302A can be a substantially (e.g., +/−10%) constant thickness. Fabricating the skin 304A as a substantially constant thickness can lower the production time or cost of the aircraft 100. As such, examples of the lap splice described herein can be produced in a cost effective and timely manner.

In certain examples, the thickness of the tapered portion 314A and/or the second edge panel portion 310A can be significantly thinner than that of the skin 304A while the skin 304A is a constant thickness. As the skin 304A can be a load bearing panel, the constant thickness of the skin 304A allows for a stronger component. In certain examples, the skin 304A can be coupled to structural member 306A through adhesives, welding, mechanical fasteners (e.g., bolts, rivets, and other fasteners), and/or through other techniques.

The edge panel 302A can be a leading panel of the aerodynamic structure 300A. That is, the edge panel 302A can include a leading edge of the aerodynamic structure 300A. In certain such examples, the edge panel 302A can receive lower loads than that of other portions of the aerodynamic structure 300A. As such, the thin tapered section of the lap splice described herein can be a portion of the edge panel 302A (e.g., as part of tapered portion 314A) to minimize wasted weight and any needed structural strengthening.

Figure 4:
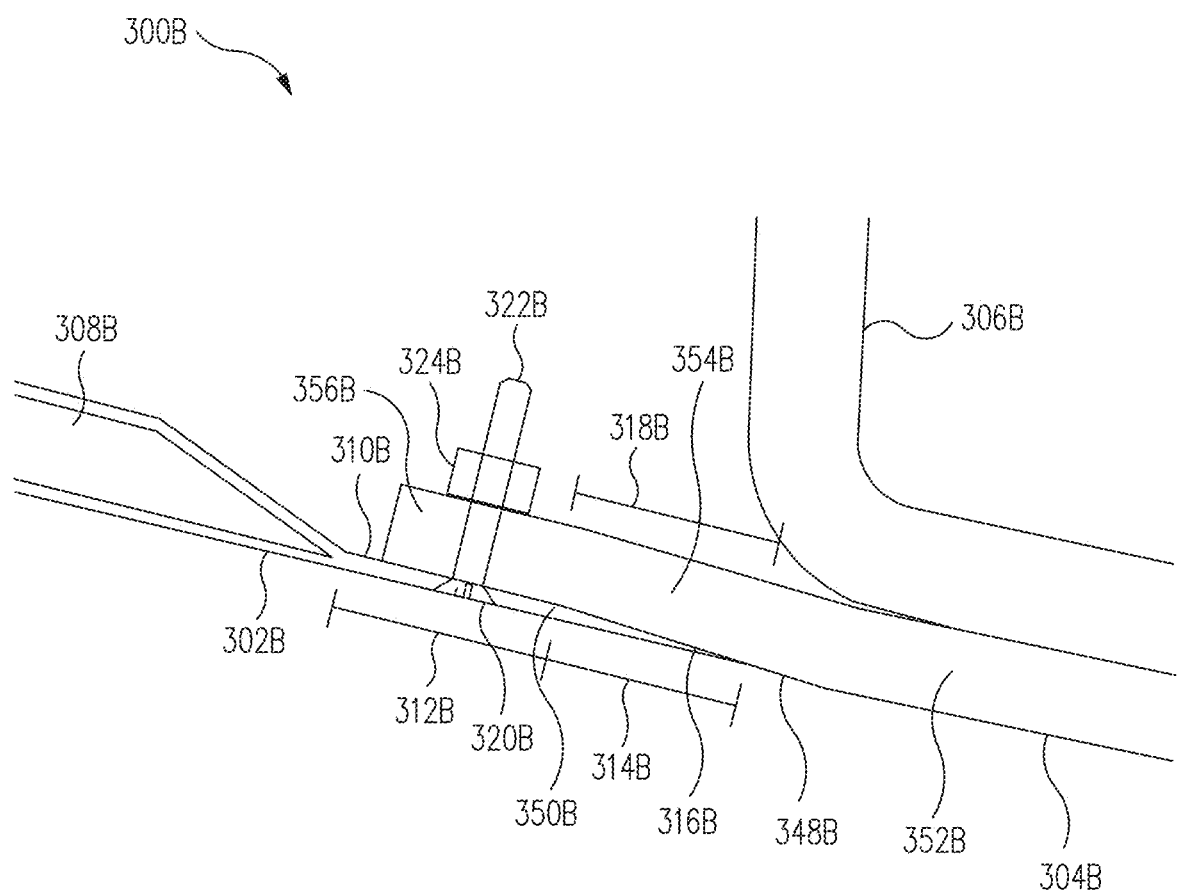
Figure 5:
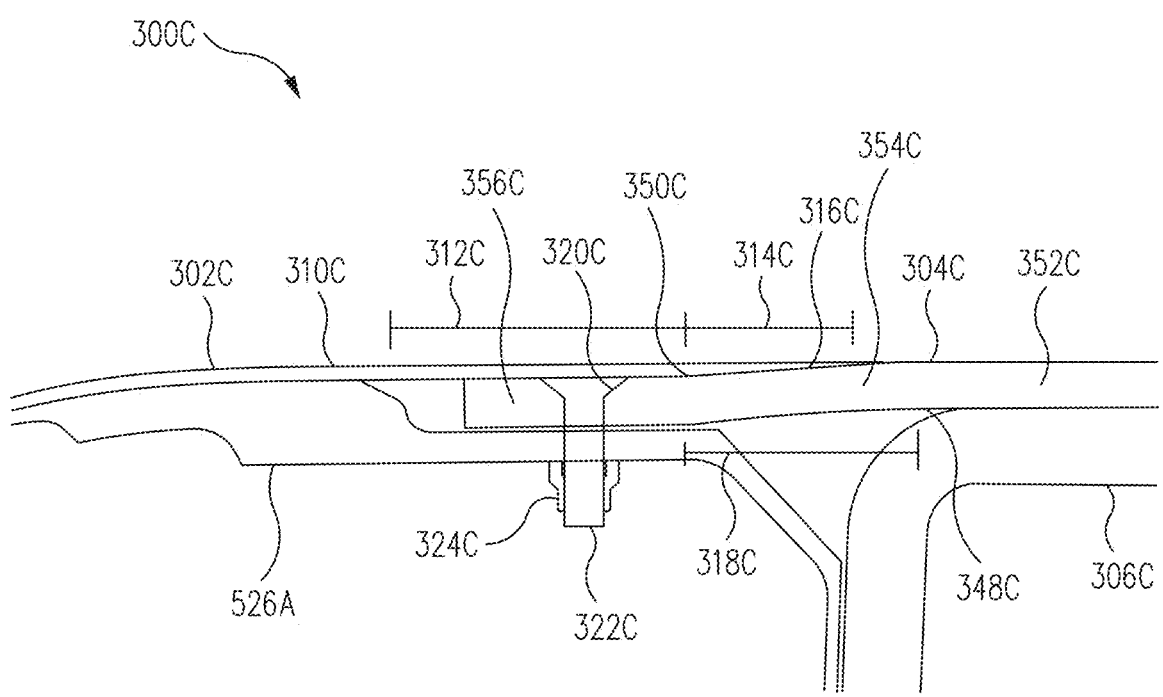
Figure 6:
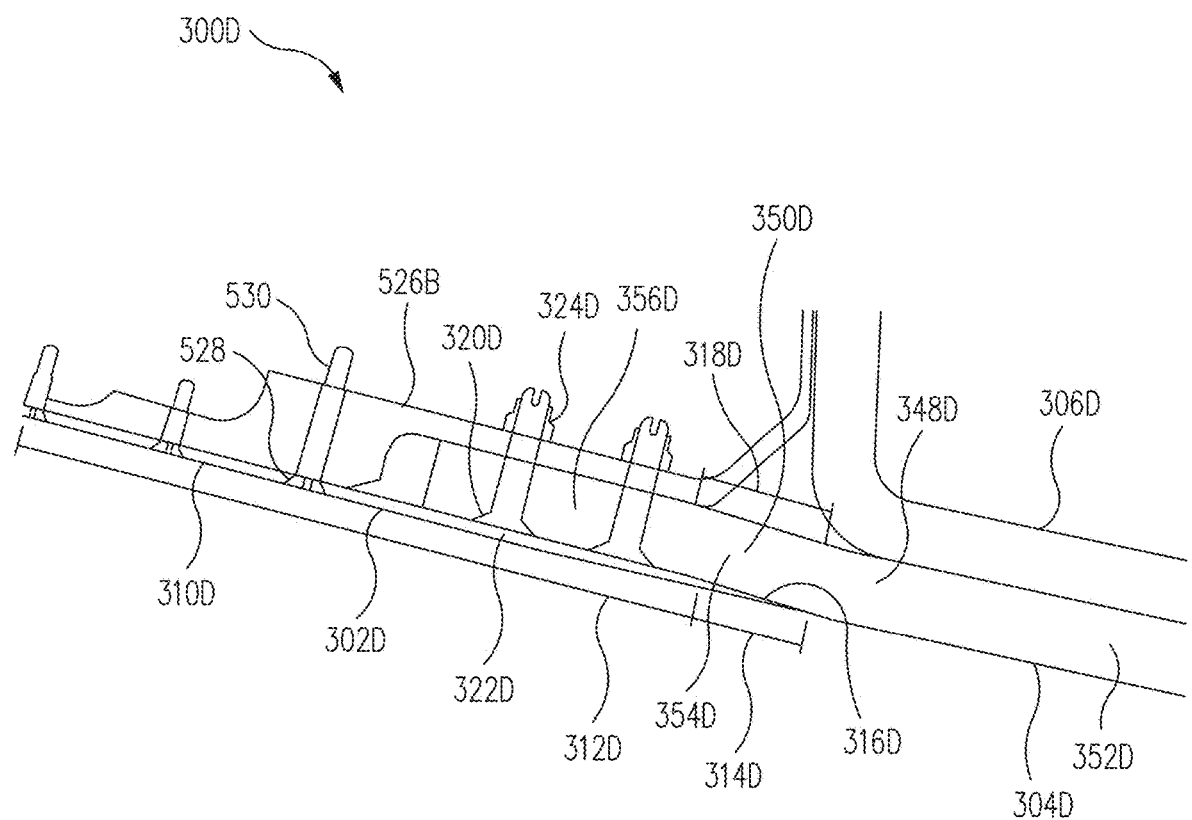
Figure 7:
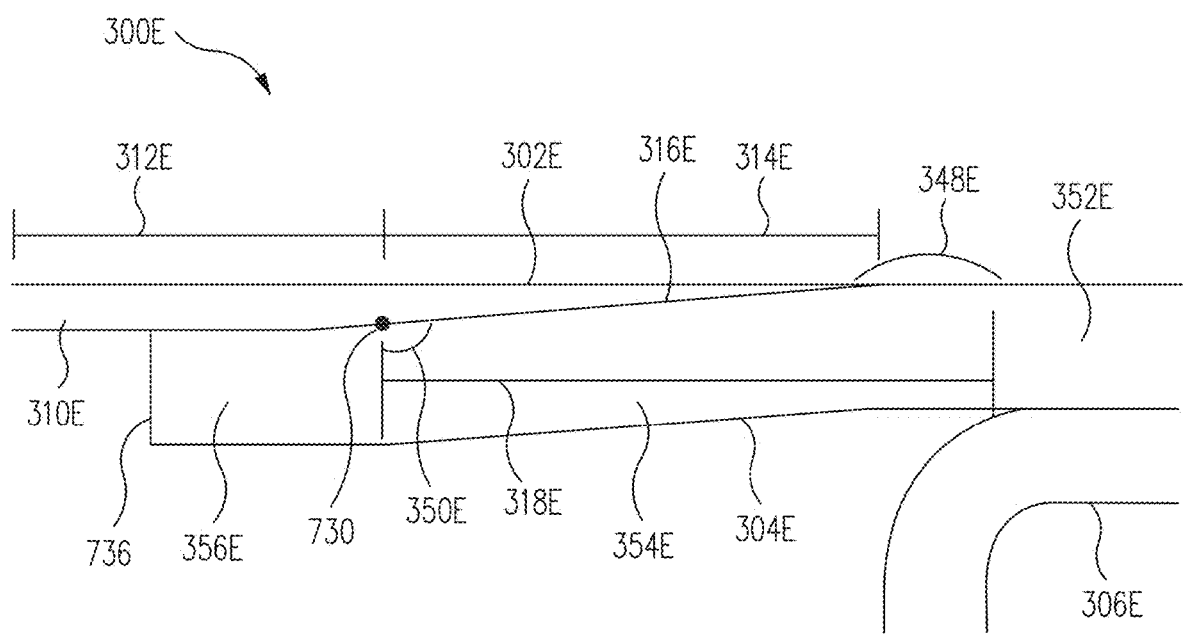
FIG. 7 illustrates a side cutaway view of a portion of another aerodynamic structure utilizing an aerodynamic surface lap splice in accordance with an example of the disclosure.
Figure 8:
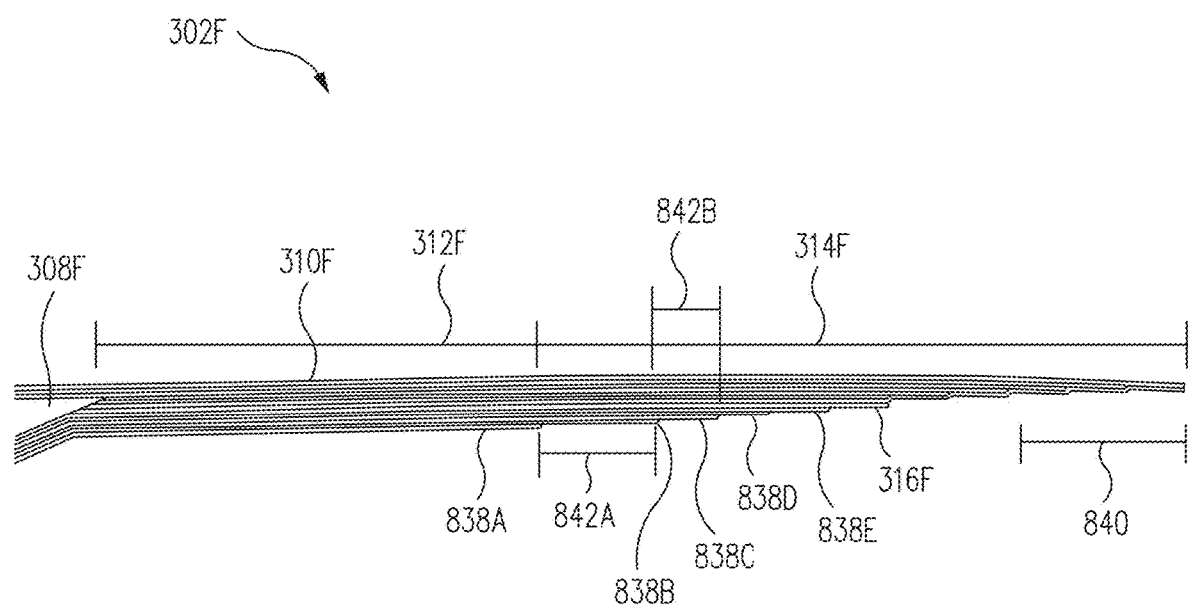
FIG. 8 illustrates a side cutaway view of a portion of a composite aerodynamic structure with an aerodynamic surface lap splice in accordance with an example of the disclosure.

FIGS. 4-6 illustrate additional examples of the aerodynamic structure, such as aerodynamic structures 300B-D, respectively. The examples shown in FIGS. 4-6, as well as in FIGS. 7 and 8, are similar to that of FIG. 3. Thus, for elements of FIGS. 4-8 not explicitly described herein with an equivalent element number to an element described for FIG. 3, (e.g., edge panel 302A and 302B) the description of FIG. 3 can apply.

FIGS. 3 and 5 illustrate examples of lap splices for upper surfaces of the aerodynamic devices 300A and 300C, respectively. FIGS. 4 and 6 illustrate examples of lap splices for lower surfaces of the aerodynamic devices 300B and 300D, respectively. FIGS. 3 and 4 illustrate examples of lap splices for components between ribs of the respective aerodynamic devices. FIGS. 5 and 6 illustrate examples lap splices for components on support fitting locations of the respective aerodynamic devices.

FIG. 5 further illustrates aerodynamic device 300C with support structure 526A coupled to edge panel 302C, skin 304C, and structural member 306C through any of the techniques described herein (e.g., through adhesives, welding, mechanical fasteners such as fastener 322C, and/or other techniques). FIG. 6 illustrates aerodynamic device 300D with similar features to that of FIG. 5, but for a lap splice used on a lower surface of the aerodynamic device 300D. In certain such examples, fastener 322C can be disposed below edge panel 302C to further improve airflow over edge panel 302C.

Additionally, as shown in FIG. 6, edge panel 302C cannot include a honeycomb as shown in FIGS. 3 and 4 due to the support structure 526A being coupled to the edge panel 302C. Coupling the support structure 526A to the edge panel 302C can eliminate the need for the honeycomb. Furthermore, support structure 526B can be coupled to the edge panel 302D through one or more pins 530 with flush head 528 in addition to bolt 322D. The support structure 526B and the edge panel 302D can include appropriate through holes to accommodate the fasteners.

FIG. 7 illustrates a side cutaway view of a portion of another aerodynamic structure utilizing an aerodynamic surface lap splice in accordance with an example of the disclosure. As shown in FIG. 7, aerodynamic device 300E includes edge panel 302E and skin 304E.

Edge panel 302E includes a constant thickness portion 312E and a tapered portion 314E. The skin 304E includes a first portion 352E, a second portion 354E, and a third portion 356E. As shown in FIG. 7, the location of inner radius 730 of bend 350E between the second portion 354E and the third portion 356E can substantially (e.g., be within a foot) match the location of the bend at the transition between the constant thickness portion 312E and the tapered portion 314E. In certain examples, the radius of the bend at the transition between the constant thickness portion 312E and the tapered portion 314E can be less than inner radius 730.

In certain examples, the skin 304E can be trimmed at edge 736. That is, for examples where the skin 304E is a composite skin, multiple layers of composites can be laid up during the manufacturing process. The layers can then be trimmed along edge 736 to form the skin 304E. In certain such examples, the skin 304E can be a substantially constant thickness throughout and can be a multi-ply composite. The edges of the skin 304E can be trimmed. When the skin 304E is a multi-ply composite, having the entire skin be a constant thickness can allow for easier manufacturing of the skin 304E as the plies can be laid and then trimmed with no need to form tapers. In certain such examples, the composite plies can be laid with a tape laying machine or through another automated technique. Forming tapers in such automated processes can be difficult and, thus, forming skin 304E without a tapered section can allow for a simplified automated process.

In certain examples, the vertical offset from the top of the first portion 352E to the top of the third portion 356E is referred to as the edge panel offset. The edge panel offset can substantially match that of the thickness of the second edge panel portion 310E. In certain examples, the edge panel offset can be in the range of 0.06 to 0.2 inches.

Second portion 354E or portions thereof can be referred to as the joggle ramp. Such a joggle ramp can be the length of distance 318E. Distance 318E can be defined as running from the centerpoint of radius 730 to the centerpoint of the radius of bend 348E. The ratio of the distance 318E to the edge panel offset can be defined as the ramp ratio. For example, a ramp ratio of 5:1 denotes that distance 318E is five times that of the edge panel offset. In certain examples, the ramp ratio of the aerodynamic devices described herein can be from 5:1 to 15:1.

FIG. 8 illustrates a side cutaway view of a portion of a composite aerodynamic structure with an aerodynamic surface lap splice in accordance with an example of the disclosure. FIG. 8 illustrates a composite edge panel 302F.

At least the second edge panel portion 310F of the edge panel 302F can be formed from a plurality of composite plies. The second edge panel portion 310F can include a constant thickness portion 312F and a tapered portion 314F. The number of plies within all of the constant thickness portion 312F can be the same, while the tapered portion 314F can have a decreasing number of plies to form the taper of the ramp surface 316F.

As such, the second edge panel portion 310F can be made from a plurality of plies 838A-E as well as additional plies. The plies 838A-E can each have different lengths and, thus, allow for the number of plies to decrease to form the taper of the ramp surface 316F. The distance between a first point where the number of plies decreases and a subsequent point where the number of plies decreases can be called a ply drop. In certain examples, the ply drop of different portions can be varied. For example, the ply drop 842A between where ply 838A ends and where ply 838B ends can be a longer distance (e.g., about 25% to 200% longer distance) than the ply drop 842B between where ply 838B ends and where ply 838C ends. In certain examples, ply drop 842A can be closer to the first end than the second end. The longer distance of the ply drop 842A can prevent the tapered portion 316F from interfering with the radius 730 of the skin 304E shown in FIG. 7.

Additionally, the end of the edge panel 302F can additionally include a region 840 with a curl offset. The edge panel 302F can bend down slightly at the curl offset of the region 840 (e.g., bend downward by a distance of 20% or less of the thickness of the edge panel 302F). Such a curl offset can allow for a more flush fitment of the edge panel 302F to the corresponding skin.

Figure 9:
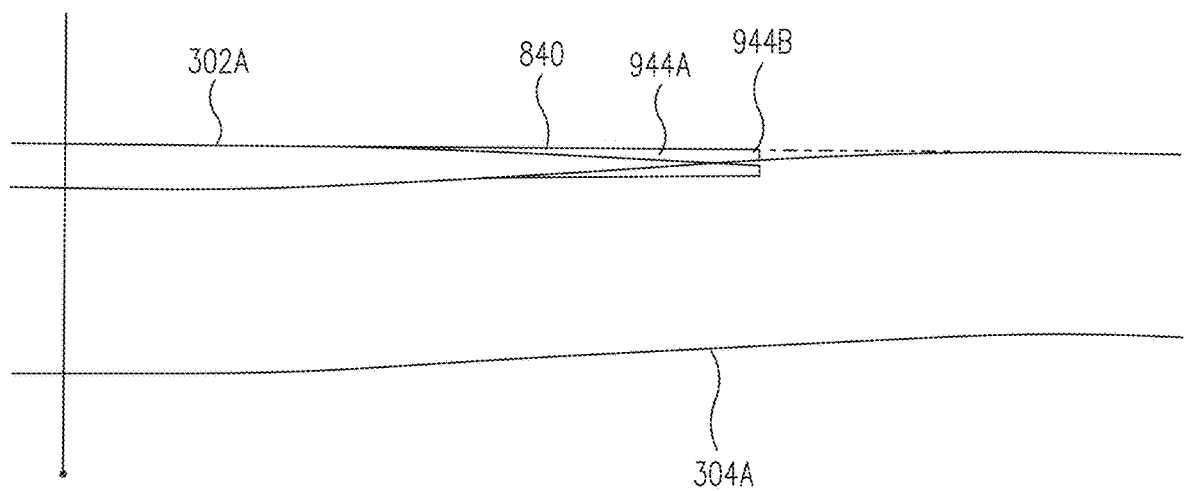
FIGS. 9-10 illustrate details of side cutaway views of portions of aerodynamic structures utilizing aerodynamic surface lap splices in accordance with examples of the disclosures.
Figure 10:
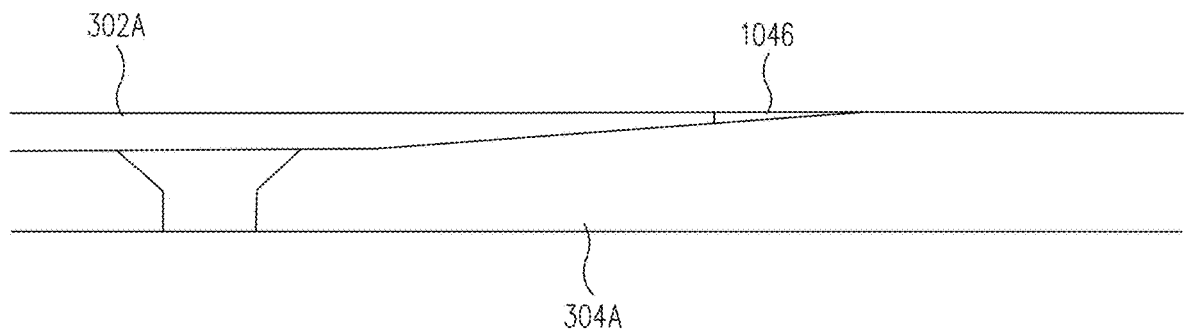

FIGS. 9-10 illustrate details of side cutaway views of portions of aerodynamic structures utilizing aerodynamic surface lap splices in accordance with examples of the disclosures.

Fitment with an edge panel with curl offset is shown in greater detail in FIG. 9. In FIG. 9, position 944A illustrates the position of the region 840 (shown in FIG. 8) with a curl offset when not coupled to the skin 304A. Position 944B illustrates the position of the region 840 when the edge panel 302A is coupled to the skin 304A. As shown, the region 840 has been pushed upward by the skin 304A and is now flush with the top of the surface of the skin 304A.

In certain examples, when edge panel 302A is coupled to skin 304A, a gap can still be present rearward of the edge panel 302A. FIG. 10 illustrates an example with filler 1046 disposed within the gap. Filler 1046 can allow for a smoother airflow transition between edge panel 302A and skin 304A.

Figure 11:
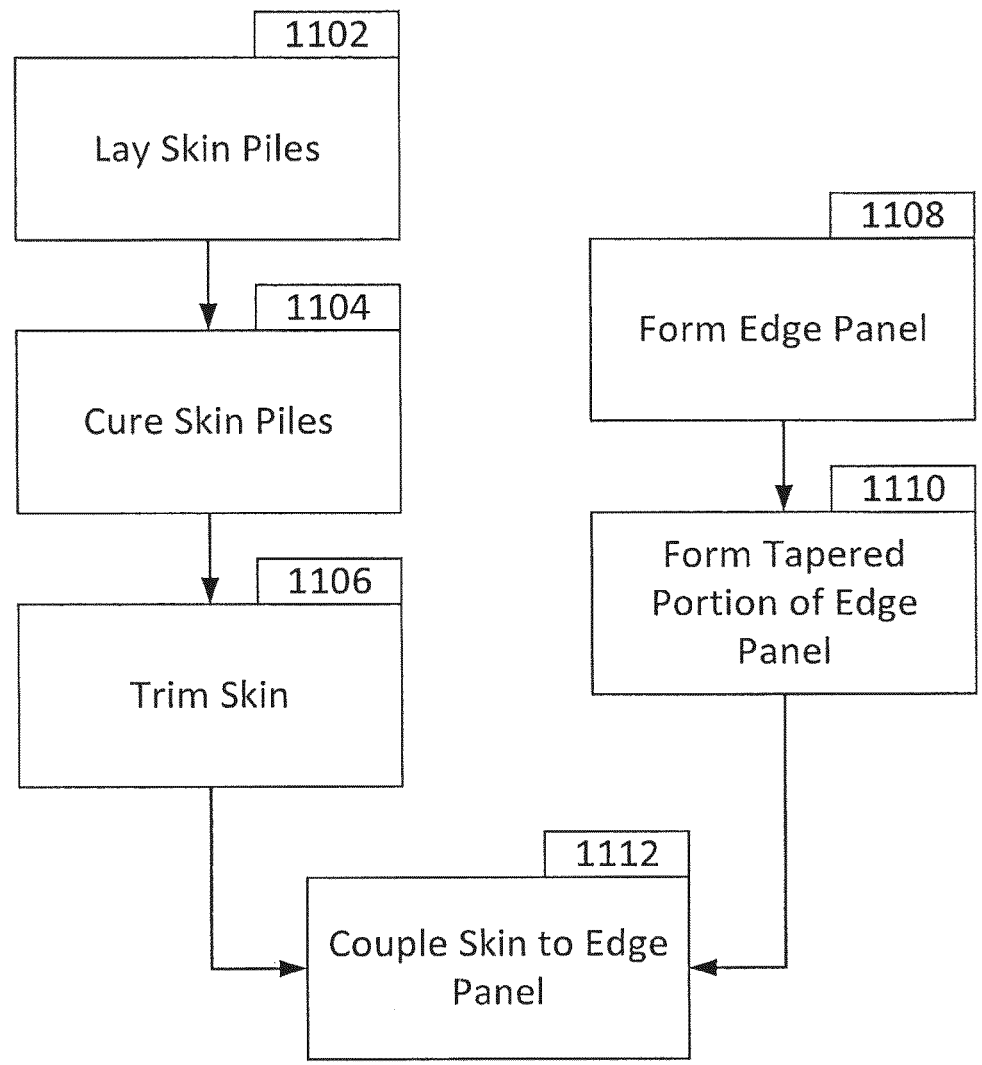
FIG. 11 is a flowchart detailing a technique for forming a portion of an aircraft with an aerodynamic surface lap splice in accordance with an example of the disclosure.

FIG. 11 is a flowchart detailing a technique for forming a portion of an aircraft with an aerodynamic surface lap splice in accordance with an example of the disclosure. As shown in FIG. 11, blocks 1102-1106 describe steps for forming a skin while blocks 1108 and 1110 describes steps for forming an edge panel.

In block 1102, the plies of the skin are laid. In certain examples, the plies can be laid by a machine. Each ply can be laid on top of previously laid plies. The plies can be laid by, for example, an automated tape laying machine or another such automated system. The plies can be laid so that the skin is a constant thickness throughout. In certain examples, the plies can be pre-impregnated with a resin or other filler, but other examples can apply the resin or other filler in a separate step.

In block 1104, the skin plies are cured. Thus, the plies can be formed into a solid component in block 1104. In certain examples, the skin plies can be cured with one or more bends within the ply, forming different portions of the skin. One or more of those portions can be configured to be disposed underneath a portion of an edge panel. In block 1106, the skin can be trimmed to form the final shape of the desired skin.

In block 1108, a portion of the edge panel can be formed. For example, a honeycomb can be held in a first position and plies of composites disposed around the outside of the composite. In block 1110, the tapered portion of the edge panel can be formed. Certain examples can form the tapered portion while plies are laid (e.g., through laying of plies of different dimensions) while other examples can form the tapered portion after the plies are laid (e.g., through machining). Further examples of the edge panel can be made from a metallic material, and the tapered portion in such examples can be formed through machining, stamping, forging, or other techniques.

After the skin and edge panels are formed, the skin can be coupled to the edge panel in block 1112. The skin and the edge panel can be coupled to form an aerodynamic device. In certain examples, the edge panel and the skin can be coupled through any technique disclosed herein.

Examples described above illustrate but do not limit the invention. It should also be understood that numerous modifications and variations are possible in accordance with the principles of the present invention. Accordingly, the scope of the invention is defined only by the following claims.

What is claimed is:

1. An aircraft structure comprising:
   an edge panel comprising a first edge panel portion and a second edge panel portion,
      wherein the second edge panel portion comprises a tapered portion and a constant thickness portion having a first thickness that is constant,
      wherein the tapered portion comprises a first end proximal to the constant thickness portion and a second end distal to the constant thickness portion, and
      wherein the tapered portion decreases in thickness from the first end to the second end; and
   a skin comprising:
      a first portion;
      a second portion; and
      a first bend disposed between the first portion and the second portion, wherein the first portion and the second portion have a second thickness, wherein at least a part of the second portion is disposed below at least a part of the tapered portion, and wherein the second thickness is greater than the first thickness,
   wherein the tapered portion includes a region having a curl offset such that the region bends in a downward direction when not coupled to the skin and is pushed upward to be flusher with a top surface of the skin when coupled to the skin.

2. The aircraft structure of claim 1, wherein the skin further comprises a third portion and a second bend disposed between the second portion and the third portion, wherein the first portion is substantially parallel to the third portion, and wherein the third portion is disposed below the constant thickness portion.

3. The aircraft structure of claim 2, wherein the tapered portion is a multi-ply composite, and wherein the tapered portion decreases in thickness by decreasing an amount of plies.

4. The aircraft structure of claim 3, wherein a ply drop offset proximate to the first end is greater than a ply drop offset proximate to the second end, and wherein the second bend is disposed proximate to the first end.

5. The aircraft structure of claim 3, wherein the first edge panel portion further comprises a honeycomb portion thicker than the constant thickness portion and the tapered portion, and wherein the honeycomb portion comprises a honeycomb disposed between a plurality of plies.

6. The aircraft structure of claim 2, further comprising:
a fastener coupling together the third portion and the constant thickness portion.

7. The aircraft structure of claim 1, wherein the tapered portion is metallic.

8. The aircraft structure of claim 1, wherein the skin is a multi-ply composite, and wherein an amount of plies is consistent throughout the skin.

9. The aircraft structure of claim 1, wherein the edge panel is a leading or trailing edge of a wing or an empennage.

10. The aircraft structure of claim 1, further comprising:
an aircraft structural member coupled to the skin; and
a fastener coupling together the skin and the aircraft structure member.

11. The aircraft structure of claim 1, wherein the region bends in the downward direction by a distance of 20% or less of the first thickness.

12. The aircraft structure of claim 1, wherein the second thickness is at least three times the first thickness.

13. An aircraft comprising the aircraft structure of claim 1, the aircraft comprising:
a fuselage; and
a wing, wherein the aircraft structure is at least partially disposed within the wing.

14. A method of manufacturing the aircraft structure of claim 1, the method comprising:
forming the skin by:
laying a plurality of composite skin plies; and
curing the plurality of composite skin plies, wherein an amount of the skin plies is consistent throughout the skin; and
coupling the skin to the edge panel.

15. The method of claim 14, wherein an automated apparatus performs the laying the plurality of composite skin plies, and wherein the forming the skin further comprises trimming an edge of the skin.

16. The method of claim 14, further comprising:
forming the edge panel by:
laying a plurality of composite edge plies, wherein the tapered portion is formed by decreasing an amount of edge plies along the tapered portion; and
curing the plurality of composite edge plies.

17. The method of claim 16, wherein the forming the edge panel further comprises disposing a honeycomb portion between at least two of the composite edge plies.

18. The method of claim 14, further comprising:
forming at least the tapered portion of the edge panel by machining a metal stock.

19. An edge panel comprising:
a constant thickness portion; and
a multi-ply composite tapered portion comprising a first end proximal to the constant thickness portion and a second end distal to the constant thickness portion,
wherein the tapered portion decreases in thickness from a first end to a second end,
wherein the tapered portion decreases in thickness by decreasing an amount of plies,
wherein a ply drop offset proximate to the first end is greater than a ply drop offset proximate to the second end; and
wherein the tapered portion includes a region having a curl offset such that the region bends in a downward direction when not coupled to a skin and is pushed upward to be flusher with a top surface of the skin when coupled to the skin.

20. The edge panel of claim 19, further comprising a honeycomb portion thicker than the constant thickness portion and the tapered portion, and wherein the honeycomb portion comprises a honeycomb disposed between a plurality of plies.

* * * * *